B. F. SMITH.
TROLLEY WHEEL.
APPLICATION FILED FEB. 27, 1909.

947,165.  Patented Jan. 18, 1910.

Witnesses
Samuel Payne
K. H. Butler

Inventor
B. F. Smith
By H. C. Evert
Attorneys

UNITED STATES PATENT OFFICE.

BERTRUM F. SMITH, OF NATRONA, PENNSYLVANIA, ASSIGNOR OF ONE-HALF TO JACOB MARKLE, OF NATRONA, PENNSYLVANIA.

TROLLEY-WHEEL.

947,165.  Specification of Letters Patent.  Patented Jan. 18, 1910.

Application filed February 27, 1909. Serial No. 480,316.

*To all whom it may concern:*

Be it known that I, BERTRUM F. SMITH, a citizen of the United States of America, residing at Natrona, in the county of Allegheny and State of Pennsylvania, have invented certain new and useful Improvements in Trolley-Wheels, of which the following is a specification, reference being had therein to the accompanying drawing.

This invention relates to trolley wheels, and the primary object of my invention is to provide a sectional wheel having an indurate wearing member that can be easily removed and renewed when worn.

Another object of this invention is to provide a trolley wheel with a detachable wearing member and means for establishing a positive electrical connection between the wearing member and the hub of the wheel.

A further object of this invention is to obviate the necessity of dispensing with an entire wheel when a portion of the same has become worn by traveling upon a trolley wire or electrical conduit.

A still further object of the invention is to provide a simple, durable and inexpensive trolley wheel that can be used in connection with the present type of trolley harp and pole.

With the above and other objects in view which will more readily appear as the invention is better understood, the same consists in the novel construction, combination and arrangement of parts to be hereinafter described and then specifically claimed.

Figure 1:
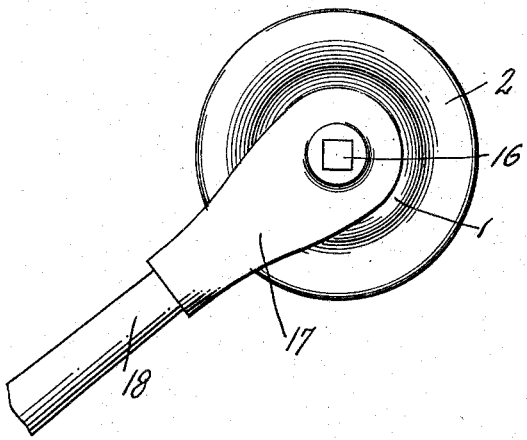
Figure 2:
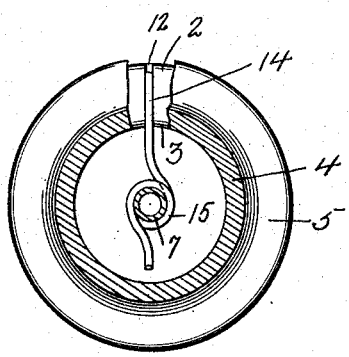
Figure 3:
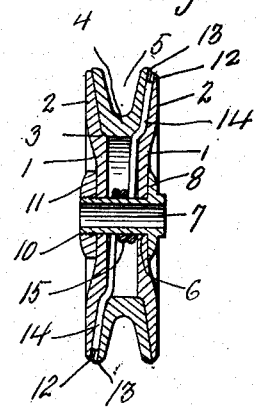

In the drawings:—Figure 1 is an elevation of a trolley wheel constructed in accordance with my invention, Fig. 2 is a vertical longitudinal sectional view of the wheel, partly broken away, and Fig. 3 is a vertical cross sectional view of the wheel.

To put my invention into practice, I provide two circular side plates 1 with peripheral offset flanges 2, the offsets providing shoulders forming seats 3 for an annular wearing member 4 having a peripheral groove 5. The wearing member 4 is substantially V-shaped in cross section, and the groove 5 thereof is adapted to receive a trolley wire or electrical conductor (not shown). To clamp the side plates 1 upon the wearing member 4, said plates are provided with alining openings 6 and extending through said openings is a tubular cylindrical hub 7 having one end thereof provided with an annular flange 8, while the opposite end thereof is threaded, as at 10, to receive a nut 11.

The inner faces of the parallel flanges 2 of the side plates 1 are provided with radially disposed grooves 12, while the outer faces of the wearing member 4 are provided with radially disposed grooves 13 confronting the grooves 12 and providing radially disposed openings for the ends 14 of a conducting wire 15 coiled around the tubular hub 7, said wire contacting with said hub and establishing a positive electrical connection between the annular wearing member 4 and said hub.

The tubular hub 7 is adapted to receive the spindle or journal pin 16 of a harp 17, carried by a trolley pole 18.

In practice, the annular wearing member 4 is made of bronze or a similar piece of durable metal, while the side plates 1 can be made of a less expensive metal and used in connection with numerous wearing members. The wheel is designed whereby the wearing member will only have to be renewed when the wheel has become worn, and it will be observed that the hub can also be renewed if the occasion demands.

While in the drawings forming a part of this application there are illustrated the preferred embodiments of my invention, I would have it understood that the detail construction thereof can be varied or changed as to shape, proportion and manner of assemblage without departing from the spirit of the invention as defined in the appended claim.

Having now described my invention what I claim as new, is:—

A trolley wheel comprising a pair of side plates centrally apertured and each having offset peripheral flanges, the offsets forming shoulders, a peripherally-grooved annular wearing-member substantially V-shaped in cross-section seated in said shoulders with the outer faces of its side walls engaging the inner faces of the peripheral flanges, each side wall of the wearing-member provided with a groove in the outer face thereof, said grooves extending radially to the wheel axis and located on opposite sides of the wheel axis, said peripheral flanges having similar radial grooves registering with the grooves in the wearing-member, and a tubular hub in said side plates, means for securing the tubular hub in position, and a conducting wire coiled on the hub between the side plates with the ends thereof extending in opposite directions into said radial grooves, as and for the purpose described.

In testimony whereof I affix my signature in the presence of two witnesses.

BERTRUM F. SMITH.

Witnesses:
   A. J. ROLL,
   ALBT. J. ROLL.